United States Patent [19]

Lin et al.

[11] Patent Number: 4,911,758

[45] Date of Patent: Mar. 27, 1990

[54] DISPOSAL OF WASTE AQUEOUS BORON TRIFLUORIDE SOLUTIONS

[75] Inventors: Ronny W. Lin; Howard W. Walker; Yung-Fu Huang, all of Baton Rouge, La.

[73] Assignee: Ethyl Corporation, Richmond, Va.

[21] Appl. No.: 270,830

[22] Filed: Nov. 14, 1988

[51] Int. Cl.$^4$ .................................................. C04B 7/02
[52] U.S. Cl. ...................................... 106/89; 106/97; 106/100
[58] Field of Search ............... 106/89, 75, 76, 85, 106/97, 100, 103, 287.27, 287.25

[56] References Cited

U.S. PATENT DOCUMENTS

| | | | |
|---|---|---|---|
| 3,857,872 | 9/1974 | Conner | 106/74 |
| 4,436,645 | 3/1984 | Ceaser | 252/179 |
| 4,518,508 | 5/1985 | Conner | 210/751 |
| 4,576,644 | 3/1986 | Goldmann | 106/100 |
| 4,601,832 | 7/1986 | Hooykaas | 210/717 |
| 4,623,469 | 11/1986 | Conner | 210/751 |
| 4,705,658 | 11/1987 | Gayczarczyk | 210/710 |

*Primary Examiner*—William R. Dixon, Jr.
*Assistant Examiner*—Chris Gallo
*Attorney, Agent, or Firm*—Joseph D. Odenweller

[57] ABSTRACT

Boron trifluoride wash water from an olefin oligomerization process can be disposed of in an environmentally safe manner by hydrolysis to substantially eliminate fluoroborate anions ($BF_4^{--}$), mixing with CaO or Ca(OH)$_2$ and concentration in any sequence followed by mixing with portland cement and solidification. The cured cement is highly resistant to aqueous leach of boron and fluorine containing products.

30 Claims, No Drawings

DISPOSAL OF WASTE AQUEOUS BORON TRIFLUORIDE SOLUTIONS

BACKGROUND

Alpha-olefin oligomers and their use as hydraulic fluids and synthetic lubricants (synlubes) are well known. U.S. Pat. No. 2,937,129 reports the oligomerization of $C_{5-14}$ α-olefins using a dialkyl peroxide catalyst to make a synlube. U.S. Pat. No. 3,113,167 describes an α-olefin oligomer process using a titanium halide and an aluminum compound as the oligomerization catalyst.

The preferred catalysts for making α-olefin oligomers are Friedel Crafts catalysts such as $BF_3$ as disclosed in U.S. Pat. No. 3,149,178. Optimum properties are obtained starting with 1-decene although mixtures of α-olefins have been used, cf. U.S. Pat. No. 3,330,883.

The preferred Friedel Crafts catalyst is $BF_3$. Pure $BF_3$ is not an effective oligomerization catalyst. A small amount of polar compound is necessary as a promoter. U.S. Pat. No. 3,382,291 describes the use of alcohol promoters such as decanol. Other reported promoters are modenite (hydrogen form), water, phosphoric acid, fatty acids (e.g. valeric acid), ketones, organic esters, ethers, polyhydric alcohols, silica gel and the like.

The most common catalyst, $BF_3$, can present a disposal problem. Various methods have been devised for removing $BF_3$ from an oligomerization reaction to achieve an environmentally acceptable result. Vogel et al. U.S. Pat. No. 4,454,366 and U.S. Pat. No. 4,384,162 describe the use of polyvinyl alcohol to remove $BF_3$ from an oligomerization reaction. Vogel et al. U.S. 4,433,197 contacts the reaction product with silica to remove the $BF_3$. Morganson et al. U.S. Pat. No. 4,429,177 and Madgavkar et al. U.S. Pat. No. 4,213,001 and U.S. Pat. No. 4,308,414 use silica as an absorbant for $BF_3$ in an oligomerization process. Madgavkar et al. U.S. Pat. No. 4,394,296 describe the use of wet silica as a co-catalyst with $BF_3$ in an oligomer process. The silica can be filtered off and recycled as the catalyst. Madgavkar et al. U.S. Pat. No. 4,263,467 remove $BF_3$ by trickling the reaction product over an inert metallic or ceramic bed whereby the $BF_3$ is said to evaporate and can be recovered.

From this it can be seen that a great deal of effort has gone into developing a method for removing $BF_3$ from an olefin oligomerization process in an environmentally safe manner.

Even with these prior methods of trapping $BF_3$ values, it is not always possible to reduce the boron and fluoride level in the oligomer to an extent such that it can be processed without further clean-up. At some stage an aqueous wash is required. Any water wash will extract boron and fluoride values from the oligomer mixture even if one of the above methods has been used to remove part of the $BF_3$. Boron and fluoride are considered environmental contaminants and strict limits have been placed in many jurisdiction on the amount of boron and fluoride that can be present in aqueous disposal streams from a chemical plant. The present process provide an environmentally safe method of disposing of aqueous $BF_3$ solutions without boron or fluoride values escaping into the environment.

SUMMARY

Aqueous waste streams containing $BF_3$ can be safely disposed of by hydrolyzing fluoroborate anions in the solution to HF and borate anion, mixing the solution with CaO or $Ca(OH)_2$ to precipitate $CaF_2$ and evaporating water to form a concentrate. The above steps can be in any sequence. The aqueous concentrate is then mixed with portland cement to a pasty consistency and allowed to harden at the disposal site.

DESCRIPTION OF THE PREFERRED EMBODIMENTS

A preferred embodiment of the invention is a process for disposing of an aqueous $BF_3$ solution in an environmentally acceptable manner, said process comprising:

(A) hydrolyzing said $BF_3$ solution to substantially lower the amount of fluoroborate anion ($BF_4-$) in said aqueous $BF_3$ solution, (B) mixing the hydrolyzed $BF_3$ solution with cement to form a paste and (C) allowing the cement paste to cure to a solid product which is highly resistant to aqueous leach of boron and fluoride compounds.

Aqueous $BF_3$ solutions contain fluoroborate anions ($BF_4-$). Tests have shown that when such solutions are mixed with cement and allowed to harden, the hardened cement will not retain boron and fluoride when subject to aqueous leach. According to the present invention it has been discovered that the reason such hardened cement does not adequately retain boron and fluorine is the presence of fluoroborate anion in the aqueous solution. It has also been discovered that this fluoroborate anion can be hydrolyzed by heating the aqueous solution to elevated temperatures. A useful hydrolysis temperature is about 60°–200° C. Higher temperatures cause the hydrolysis to proceed at a faster rate so a preferred hydrolysis temperature range is about 80°–200° C. Of course at temperatures above the normal boiling point the hydrolysis will require a closed autoclave.

The hydrolysis proceeds faster if the solution remains acidic (e.g. pH 1-3). In a preferred embodiment, lime (either CaO, $Ca(OH)_2$ or mixtures of both) are added to the aqueous $BF_3$ solution. In another mode, the $BF_3$ is extracted from a completed $BF_3$-catalyzed oligomerization process with alkaline (e.g. 3-10 weight percent NaOH) wash water. In such cases the solution becomes substantially neutral or slightly alkaline. Such neutral or alkaline solutions are more difficult to hydrolyze and require higher minimum temperatures. A useful range when the solution is neutral or basic is about 100°–200° C., preferably about 120°–175° C. and most preferably about 120°–150° C.

In a preferred embodiment the amount of CaO and/or $Ca(OH)_2$ added to the aqueous $BF_3$ solution is sufficient to provide about 0.5-2.5 moles, more preferably about 1-2 moles and most preferably about 1.5 moles of CaO and/or $Ca(OH)_2$ per mole of $BF_3$ in the initial aqueous $BF_3$ solution. The term "aqueous $BF_3$ solution" is used in a generic sense since the $BF_3$ in such solutions might not exist as discrete molecules of $BF_3$ but might be in other forms such as $BF_3.2H_2O$, $BF_4-$, and the like.

In another preferred embodiment, alkali metal base is added to the aqueous $BF_3$ solution to form a substantially neutral or slightly alkaline solution. Initial aqueous $BF_3$ solutions are acidic (pH less than 2.0) unless the $BF_3$ was obtained by an aqueous base extraction procedure in which case the solution will be less acidic and probably neutral or basic depending on the amount of base in the water wash. Acidic $BF_3$ solutions present a severe corrosion problem. Hence if the initial aqueous $BF_3$ solution is acidic, it is preferred to initially add an alkali metal base, e.g. NaOH, KOH, $Na_2CO_3$ and the like, to form a neutral or slightly basic solution. This requires about 1.1–1.75 moles and more often about 1.2–1.6 moles of base (e.g. NaOH) per mole of $BF_3$ in the aqueous $BF_3$ solution, in whatever form the $BF_3$ might then be in.

When the aqueous $BF_3$ is obtained by water-washing a completed $BF_3$ catalyzed olefin oligomerization reaction, the base can readily be introduced at that stage by using an alkaline water wash. The preferred amount of base to obtain a neutral extract is the same 1.1–1.75, more often 1.2–1.6 moles per mole of $BF_3$ in the olefin oligomerization mixture. Any water-soluble promoters in the oligomerization reaction, e.g. alcohols, will be extracted together with the $BF_3$ but these have had no bad effect on the present disposal process.

Use of the present process with dilute $BF_3$ solutions will result in a slurry containing much more water than necessary. This in turn would require a large amount of cement to encase the boron and fluoride. This can be avoided by distilling excess water from the aqueous $BF_3$ solution to form a concentrate. This can be done prior to, during or after the hydrolysis. The concentrate preferably will have a water:$BF_3$ weight ratio in the range of about 5–15:1 and more preferably about 6–13:1. The term "$BF_3$" refers to the amount of $BF_3$ that went in to the formation of the initial aqueous $BF_3$ solution and does not require that the $BF_3$ still be in that same form.

More preferably the distillation is conducted with a substantially neutral $BF_3$ solution obtained by either extracting $BF_3$ using an alkaline wash water or by adding alkali metal base to an acidic $BF_3$ solution. Following concentration, CaO and/or $Ca(OH)_2$ are added to provide 1–2 moles per mole of initial $BF_3$. The mixture is then hydrolyzed at about 100°–200° C., preferably about 120°–175° C. and most preferably about 120°–150° C.

Alternatively the CaO and/or $Ca(OH)_2$ can be added prior to the concentration step.

The resultant concentrate is a slurry of mainly $CaF_2$ in an aqueous solution containing alkali metal (e.g. $Na^+$), calcium and borate ions. This is then mixed with portland cement to form a paste. Any portland cement can be used including types I-V (ASTM Specification C150-76). The preferred portland cement is type I.

A cement paste can be made by mixing the hydrolyzed aqueous $BF_3$ with the portland cement. A preferred ratio is about 100–150 parts by weight portland cement per 100 parts of hydrolyzed aqueous $BF_3$ mixture. The cement paste can be removed to a disposal site and allowed to harden. Alternatively sand/gravel mixtures can be included in the cement paste and the resultant product used to form concrete at construction sites.

The following example shows how the disposal process is conducted.

EXAMPLE

Initially an olefin oligomerization process is carried out by placing 1-decene in a reaction vessel and adding sufficient n-butanol to supply 0.6 weight percent n-butanol. This solution is stirred at 30° C. in the closed reaction vessel and $BF_3$ gas injection started. After an initial period the pressure in the vessel rises due to $BF_3$ pressure. Cooling is applied to control the temperature at about 30°–35° C. Boron trifluoride pressure is held at 20 psig as the reaction proceeds at 30°–35° C. for two hours. It is essentially complete at that time as shown by GC analysis showing less than 1 weight percent monomer. The vessel is vented and a sample analyzed for $BF_3$. Then, about 7 weight percent aqueous NaOH is added in an amount to provide 1.4 moles of NaOH per mole of $BF_3$ in the oligomer. This mixture is agitated for 15 minutes to extract almost all the $BF_3$ into the aqueous phase forming a substantially neutral (pH 6–7) solution.

The aqueous phase is removed from the vessel and concentrated in an evaporator until the water:$BF_3$ ratio is 12. The concentrate is transferred to a pressure vessel and 1.5 moles of $Ca(OH)_2$ per mole of $BF_3$ is added. The vessel is sealed and heated to 150° C. as pressure rises to 50 psig. Hydrolysis is continued for 1.5 hours at 150° C. and the slurry is then cooled (pH 13). Analysis shows fluoroborate anion content to be less than 100 ppm. An additional 0.5 mole of $Ca(OH)_2$ per mole of $BF_3$ is added and the slurry is transferred to a cement mixer. Then 125 parts by weight type I portland cement per each 100 parts of slurry is added and the mixture is processed to a paste. The paste is then cast as a block and allowed to cure for three weeks at 15°–25° C.

Boron and fluoride leach tests were conducted by Extraction Procedure (EP) Toxicity Test Method and Structural Integrity Test (EPA Method 1310).

The following table describes the conditions for a series of runs including the amount of fluoride and boron detected in the above leachate test.

| Run No. | NaOH/[1] $BF_3$ Ratio | $Ca(OH)_2$/[2] $BF_3$ Ratio | Hydrolysis[3] | Cement/ $BF_3$ Wt. Ratio | $H_2O$/ Cement Wt. Ratio | EPA Method 1310 Leachate F (ppm) | EPA Method 1310 Leachate B (ppm) |
|---|---|---|---|---|---|---|---|
| 1 | 1.7 | — | No | 9.6 | 0.39 | 200 | 74 |
| 2 | — | 2.0 | No | 7.8 | 0.83 | 366 | 114 |
| 3 | 1.96 | 1.6 | Yes | 11.1 | 0.54 | ≦3.8 | 10.5 |
| 4 | 1.0 | 1.5 | Yes | 7.0 | 0.59 | ≦4.8 | 13.1 |
| 5 | 1.0 | 1.5 | Yes | 12.0 | 0.47 | ≦3.8 | 7.5 |
| 6 | 2.0 | 1.5 | Yes | 12.0 | 0.59 | ≦3.8 | 9.6 |
| 7 | 1.0 | 2.0 | Yes | 12.0 | 0.56 | ≦3.8 | 5.6 |
| 8 | 2.0 | 2.0 | Yes | 20.0 | 0.52 | ≦3.8 | 0.1 |

[1]This is the NaOH/$BF_3$ mole ratio in the aqueous NaOH solution.
[2]This is the $Ca(OH)_2$/$BF_3$ mole ratio of the $Ca(OH)_2$ added to the $BF_3$/NaOH solution.
[3]This indicates whether the mixture was heated to cause hydrolysis of the fluroborate anion.

These results clearly show that when the hydrolysis step is omitted there is an excessive amount of both boron and fluoride in the leachate. Including the hydrolysis step to hydrolyze fluoroborate anions sharply drops the amount of boron and fluoride in the leachate to very low values.

We claim:

1. A process for disposing of an aqueous $BF_3$ solution in an environmentally acceptable manner, said process comprising:
   (A) hydrolyzing said $BF_3$ solution to substantially lower the amount of fluoroborate anion ($BF_4-$) in said aqueous $BF_3$ solution,
   (B) mixing the hydrolyzed $BF_3$ solution with cement to form a paste and
   (C) allowing the cement paste to cure to a solid product which is highly resistant to aqueous leach of boron and fluoride compounds.

2. A process of claim 1 wherein said aqueous $BF_3$ solution is concentrated before, during or after said hydrolysis such that the water:$BF_3$ weight ratio, in any form the $BF_3$ might then exist, is in the range of 6-13:1.

3. A process of claim 1 wherein said hydrolysis is conducted at a temperature of about 60°-200° C.

4. A process of claim 2 wherein said hydrolysis is conducted in the presence of calcium oxide, calcium hydroxide or mixtures thereof whereby the $BF_3$ hydrolyzate forms calcium fluoride and calcium borate.

5. A process of claim 4 wherein the amount of CaO and/or $Ca(OH)_2$ provides about 1-2 moles of CaO and/or $Ca(OH)_2$ per mole of initial $BF_3$ in said aqueous $BF_3$ solution.

6. A process of claim 5 wherein said hydrolysis is conducted at a temperature of about 60°-200° C.

7. A process of claim 2 wherein calcium oxide, calcium hydroxide or mixtures thereof is added to the hydrolyzed aqueous $BF_3$ solution.

8. A process of claim 7 wherein the amount of CaO and/or $Ca(OH)_2$ added provides about 1-2 moles of CaO and/or $Ca(OH)_2$ per mole of initial $BF_3$ in said aqueous $BF_3$ solution.

9. A process of claim 8 wherein said hydrolysis is conducted at a temperature of about 60°-200° C.

10. A process of claim 1 wherein said aqueous $BF_3$ solution is a substantially neutral solution caused by the use of an aqueous alkaline solution to extract $BF_3$ in forming said solution or by the addition of alkali metal base to an acidic aqueous $BF_3$ solution.

11. A process of claim 10 wherein said substantially neutral aqueous $BF_3$ solution is concentrated before, during or after hydrolysis such that the water:$BF_3$ weight ratio, in any form the $BF_3$ might then exist, is in the range of 6-13.

12. A process of claim 11 wherein said hydrolysis is conducted in the presence of CaO and/or $Ca(OH)_2$ whereby the $BF_3$ hydrolyzate forms calcium fluoride and calcium borate.

13. A process of claim 12 wherein the amount of CaO and/or $Ca(OH)_2$ provides about 1-2 moles of CaO and/or $Ca(OH)_2$ per mole of initial $BF_3$ in said aqueous $BF_3$ solution.

14. A process of claim 13 wherein said hydrolysis is conducted at about 120°-175° C.

15. A process of claim 11 wherein CaO and/or $Ca(OH)_2$ is added to the hydrolyzed aqueous $BF_3$ solution.

16. A process of claim 15 wherein the amount of CaO and/or $Ca(OH)_2$ added provides about 1-2 moles of CaO and/or $Ca(OH)_2$ per mole of initial $BF_3$ in said aqueous $BF_3$ solution.

17. A process of claim 16 wherein said hydrolysis is conducted at about 120°-150° C.

18. A process of claim 1 wherein said aqueous $BF_3$ solution is the wash solution obtained by subjecting a completed $BF_3$-catalyzed aliphatic olefin oligomerization procedure to an aqueous wash to extract $BF_3$.

19. A process of claim 18 wherein said wash solution is substantially neutral due to the use of aqueous base to wash the oligomer or due to the addition of alkali metal base to the acidic aqueous $BF_3$ wash water.

20. A process of claim 19 wherein said substantially neutral wash solution is concentrated before, during or after said hydrolys such that the water:$BF_3$ weight ratio, in any form that the $BF_3$ might then be in, is in the range of 6-13:1.

21. A process of claim 20 wherein said hydrolysis is conducted at a temperature in the range of 60°-200° C. in the presence of CaO and/or $Ca(OH)_2$ whereby the $BF_3$ hydrolyzate forms calcium fluoride and calcium borate.

22. A process of claim 21 wherein the amount of CaO and/or $Ca(OH)_2$ provides about 1-2 moles of CaO and/or $Ca(OH)_2$ per mole of initial $BF_3$ in said wash solution.

23. A process of claim 20 wherein said hydrolysis is conducted at a temperature in the range of about 60°-200° C. and CaO and/or $Ca(OH)_2$ is added to the hydrolyzed wash solution whereby the $BF_3$ hydrolyzate forms calcium fluoride and calcium borate.

24. A process of claim 23 wherein the amount of CaO and/or $Ca(OH)_2$ provides about 1-2 moles of CaO and/or $Ca(OH)_2$ per mole of initial $BF_3$ in said wash solution.

25. A process of claim 20 wherein said wash solution is substantially neutral due to the use of aqueous base to wash the oligomer.

26. A process of claim 25 wherein said alkali metal base is sodium hydroxide.

27. A process of claim 26 wherein said hydrolysis is conducted in the presence of CaO and/or $Ca(OH)_2$ at a temperature in the range of about 120°-175° C.

28. A process of claim 27 wherein the amount of CaO and/or $Ca(OH)_2$ provides about 1-2 moles of CaO and/or $Ca(OH)_2$ per mole of initial $BF_3$ in said wash solution.

29. A process for removing and disposing of $BF_3$ from a reaction mixture resulting from a completed $BF_3$-catalyzed olefin oligomerization procedure, said process comprising:
   (A) washing said reaction mixture with an aqueous sodium hydroxide solution containing about 1.1-1.75 moles of NaOH per mole of $BF_3$ in said reaction mixture, to obtain an almost neutral wash solution,
   (B) adding about 1.3-1.7 moles of CaO and/or $Ca(OH)_2$,
   (C) distilling water from said wash solution to obtain a concentrate in which the water:$BF_3$ weight ratio, in any form the $BF_3$ might then exist, is in the range of about 10-13:1,
   (D) heating the resultant concentrate at about 120°-175° C. under pressure sufficient to maintain a liquid phase for a period of time sufficient to hydrolyze said concentrate such that the fluoroborate anion ($BF_4-$) concentration is less than 300 parts per million by weight to obtain a hydrolyzed mixture,
   (E) mixing about 100 parts by weight of said hydrolyzed mixture with about 100-150 parts by weight of portland cement to form a paste and
   (F) allowing said paste to cure to form a solid product which is highly resistant to aqueous leach of boron and fluoride compounds.

30. A process of claim 29 wherein the sequence of Steps (B) and (C) is reversed.

* * * * *